United States Patent
Wang et al.

(10) Patent No.: US 11,937,005 B2
(45) Date of Patent: Mar. 19, 2024

(54) REGULATOR-FREE OUTPUT STAGE CIRCUIT FOR PROVIDING A STABLE OUTPUT VOLTAGE SIGNAL

(71) Applicant: Guangzhou Tyrafos Semiconductor Technologies Co., LTD, Guangzhou (CN)

(72) Inventors: Jia-Shyang Wang, Miaoli County (TW); Ping-Hung Yin, Taipei (TW)

(73) Assignee: Guangzhou Tyrafos Semiconductor Technologies Co., LTD, Guangzhou (CN)

( * ) Notice: Subject to any disclaimer, the term of this patent is extended or adjusted under 35 U.S.C. 154(b) by 219 days.

(21) Appl. No.: 17/518,583

(22) Filed: Nov. 3, 2021

(65) Prior Publication Data

US 2022/0147081 A1   May 12, 2022

Related U.S. Application Data

(60) Provisional application No. 63/110,370, filed on Nov. 6, 2020.

(51) Int. Cl.
*G05F 1/56* (2006.01)
*H04N 25/587* (2023.01)
(Continued)

(52) U.S. Cl.
CPC .............. *H04N 25/75* (2023.01); *G05F 1/56* (2013.01); *H04N 25/587* (2023.01); *H04N 25/771* (2023.01); *H04N 25/778* (2023.01)

(58) Field of Classification Search
CPC .......... G05F 1/462; G05F 1/465; G05F 1/468; G05F 1/56; G05F 1/575; G05F 1/562;
(Continued)

(56) References Cited

U.S. PATENT DOCUMENTS

| | | | | |
|---|---|---|---|---|
| 4,438,388 A | * | 3/1984 | Lee | .................. H03K 19/00384 |
| | | | | 327/535 |
| 10,048,717 B1 | * | 8/2018 | Chen | ........................ G05F 3/262 |

(Continued)

FOREIGN PATENT DOCUMENTS

| | | |
|---|---|---|
| TW | I328348 | 8/2010 |
| TW | 201105035 | 2/2011 |

(Continued)

OTHER PUBLICATIONS

"Office Action of Taiwan Counterpart Application", dated Apr. 28, 2022, p. 1-p. 7.

*Primary Examiner* — Kevin J Comber
*Assistant Examiner* — Nusrat Quddus
(74) *Attorney, Agent, or Firm* — JCIPRNET

(57) ABSTRACT

An output stage circuit including a current source circuit, a bias circuit, and an output circuit is provided. The bias circuit is coupled between the current source circuit and a ground terminal voltage. The output circuit includes a first transistor, a second transistor, a third transistor, and a load circuit. A control terminal of the first transistor is coupled to the bias circuit. The load circuit is coupled to a second terminal of the first transistor. A second terminal of the second transistor is coupled to a first terminal of the first transistor. A first terminal of the third transistor is coupled to the second terminal of the first transistor.

16 Claims, 6 Drawing Sheets

(51) Int. Cl.
*H04N 25/75* (2023.01)
*H04N 25/771* (2023.01)
*H04N 25/778* (2023.01)

(58) Field of Classification Search
CPC .......... G05F 1/565; G05F 1/567; G05F 1/569; G05F 1/571; G05F 1/573; G05F 1/5735
See application file for complete search history.

(56) References Cited

U.S. PATENT DOCUMENTS

| | | | |
|---|---|---|---|
| 10,347,325 B1 | 7/2019 | Chou et al. | |
| 10,459,474 B1* | 10/2019 | Wang | G05F 3/26 |
| 2003/0020532 A1* | 1/2003 | Akaogi | G05F 1/618 |
| | | | 327/427 |
| 2007/0090860 A1* | 4/2007 | Hsu | H03F 3/50 |
| | | | 327/108 |
| 2011/0084733 A1* | 4/2011 | Huang | H03K 5/023 |
| | | | 327/108 |
| 2011/0285464 A1* | 11/2011 | Montalvo | H03F 3/193 |
| | | | 330/253 |
| 2012/0146595 A1* | 6/2012 | Wong | G05F 1/56 |
| | | | 323/265 |
| 2014/0184184 A1* | 7/2014 | Yajima | G01R 19/0084 |
| | | | 323/274 |
| 2014/0266105 A1* | 9/2014 | Li | G05F 1/565 |
| | | | 323/280 |
| 2016/0209854 A1* | 7/2016 | Yen | G05F 3/267 |
| 2016/0240230 A1 | 8/2016 | Lee | |
| 2019/0020323 A1* | 1/2019 | Schulz | G05F 3/22 |
| 2019/0235543 A1* | 8/2019 | Chen | G05F 1/575 |
| 2019/0334532 A1* | 10/2019 | Schrei | H03L 7/0898 |
| 2020/0145002 A1 | 5/2020 | Srinivasan et al. | |
| 2020/0183438 A1* | 6/2020 | Collins | G05F 3/20 |
| 2021/0149427 A1* | 5/2021 | Moctezuma | H03K 5/00006 |
| 2021/0234514 A1* | 7/2021 | Sousa | H03F 1/3205 |
| 2021/0320630 A1* | 10/2021 | Li | H03K 5/24 |
| 2022/0137659 A1* | 5/2022 | Malave-Perez | G05F 3/262 |
| | | | 323/273 |
| 2022/0283600 A1* | 9/2022 | Matsuo | G05F 1/59 |
| 2023/0327621 A1* | 10/2023 | Michal | H03F 3/45273 |
| | | | 330/252 |

FOREIGN PATENT DOCUMENTS

| | | |
|---|---|---|
| TW | I381638 | 1/2013 |
| TW | I401884 | 7/2013 |

* cited by examiner

REGULATOR-FREE OUTPUT STAGE CIRCUIT FOR PROVIDING A STABLE OUTPUT VOLTAGE SIGNAL

CROSS-REFERENCE TO RELATED APPLICATION

This application claims the priority benefit of U.S. application No. 63/110,370, filed on Nov. 6, 2020. The entirety of the above-mentioned patent application is hereby incorporated by reference herein and made a part of this specification.

BACKGROUND

Technical Field

The disclosure relates to a circuit, and in particular, to an output stage circuit.

Description of Related Art

Generally, a conventional output stage circuit can only provide a voltage output result that is the same as an I/O Supply Voltage (IOVDD). Therefore, if a circuit needs an output voltage at a different voltage level, the voltage level of the output voltage has to be changed through a regulator in the conventional output stage circuit. With regard to the above, when the conventional output stage circuit is further equipped with a regulator circuit, the complexity of the entire circuit design is greatly increased and it takes up more circuit space. Accordingly, some embodiments are provided below as solutions.

SUMMARY

The disclosure is directed to an output stage circuit with a regulator-free design.

The output stage circuit of the disclosure includes a current source circuit, a bias circuit, and an output circuit. The bias circuit is coupled between the current source circuit and a ground terminal voltage. The output circuit includes a first transistor, a second transistor, a third transistor, and a load circuit. A control terminal of the first transistor is coupled to the bias circuit. The load circuit is coupled to a second terminal of the first transistor and an output terminal. A first terminal of the second transistor is coupled to a supply voltage. A second terminal of the second transistor is coupled to a first terminal of the first transistor. A first terminal of the third transistor is coupled to the second terminal of the first transistor and the output terminal. A second terminal of the third transistor is coupled to the ground terminal voltage.

Based on the above, the output stage circuit of the disclosure can effectively provide a stable output voltage signal.

In order to make the aforementioned features and advantages of the disclosure comprehensible, embodiments accompanied with drawings are described in detail below.

DESCRIPTION OF THE EMBODIMENTS

Figure 1:
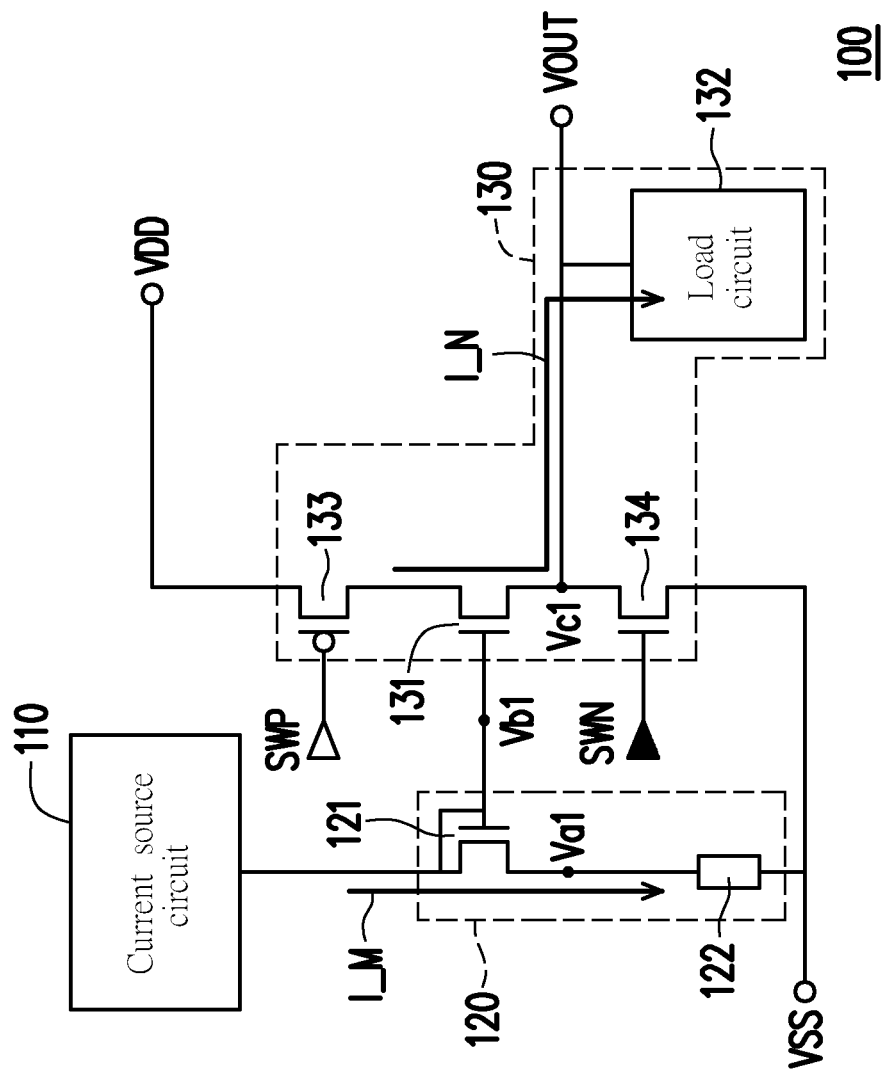
FIG. 1 is a schematic circuit diagram of an output stage circuit according to an embodiment of the disclosure.

In order to make the contents of the disclosure easier to understand, the following embodiments are specifically described as examples based on which the disclosure may be implemented. Wherever possible, the elements/components/steps with the same reference numerals in the drawings and embodiments represent the same or similar parts.

FIG. 1 is a schematic circuit diagram of an output stage circuit according to an embodiment of the disclosure. Referring to FIG. 1, an output stage circuit 100 may be an output pad circuit. The output stage circuit 100 includes a current source circuit 110, a bias circuit 120, and an output circuit 130. The bias circuit 120 and the output circuit 130 may form a replica bias circuit. The bias circuit 120 includes a transistor 121 and a reference resistor 122. The output circuit 130 includes a transistor 131, a load circuit 132, a transistor 133, and a transistor 134. In the embodiment, a first terminal of the transistor 121 is coupled to the current source circuit 110 and a control terminal of the transistor 121. A first terminal of the reference resistor 122 is coupled to a second terminal of the transistor 121. A second terminal of the reference resistor 122 is coupled to a ground terminal voltage VSS. In another embodiments of the disclosure, the bias circuit 120 may include only the transistor 121, and the second terminal of the transistor 121 is coupled to the ground terminal voltage VSS. Or, in still another embodiments of the disclosure, the bias circuit 120 may include only the reference resistor 122, and the first terminal of the transistor 122 is coupled to the current source circuit 110.

In the embodiment, a control terminal of the transistor 131 is coupled to the control terminal of the transistor 121. The load circuit 132 is coupled to a second terminal of the transistor 131 and an output terminal VOUT. A first terminal of the transistor 133 is coupled to a supply voltage VDD. A second terminal of the transistor 133 is coupled to a first terminal of the transistor 131. A first terminal of the transistor 134 is coupled to the second terminal of the transistor 131 and the (voltage) output terminal VOUT. A second terminal of the transistor 134 is coupled to the ground terminal voltage VSS.

In the embodiment, the transistors 121, 131, and 134 may be N-type transistors, and the transistor 133 may be a P-type transistor. The load circuit 132 may include a resistor and/or a capacitor, and the disclosure is not limited thereto. Furthermore, in another embodiments of the disclosure, the output stage circuit 100 may not include the load circuit 132. A control terminal of the transistor 133 and a control terminal of the transistor 134 may respectively receive a switch signal SWN and a switch signal SWP. In some embodiments of the disclosure, the switch signal SWN and the switch signal SWP may be the same switch signals; however, the disclosure is not limited thereto. In the embodiment, a turn-on period of the transistor 133 and a turn-on period of the transistor 134 are not overlapped; however, the disclosure is not limited thereto.

In the embodiment, the bias circuit 120 and the output circuit 130 may be respectively designed to cause a current ratio of a current I_M flowing through the bias circuit 120 to a current I_N flowing through the output circuit 130 to be M:N. M and N are positive integers. For example, the bias circuit 120 may include M transistors 121 connected in parallel, and the output circuit 130 may include N transistors 131 connected in parallel. M and N are positive integers. In addition, a ratio of a number of resistors connected in parallel of the reference resistor 122 of the bias circuit 120 to a number of resistors connected in parallel in the load circuit 132 of the output circuit 130 may be designed to be M:N. Therefore, in the embodiment, as shown in FIG. 1, after a voltage of a circuit node Va1 (the second terminal of the transistor 121) is set (i.e. the current I_M is set), a voltage of a circuit node Vb1 (the control terminal of the transistor 121) and a voltage of a circuit node Vc1 (the second terminal of the transistor 131) are fixed. In other words, when the current I_M changes, a voltage of the output terminal VOUT may follow the voltage of the circuit node Va1 to achieve an output stage function capable of adjusting a voltage level of the output voltage. Furthermore, the output stage circuit 100 of the embodiment may provide a stable output voltage signal. Note that since the bias circuit 120 and the output circuit 130 have the same elements and the only difference is the numbers of the elements, the voltage level of the output voltage may accurately track the set voltage of the node Va1 without being affected by a process, a voltage, and/or a temperature.

In addition, bases of the transistors 121, 131, 133, and 134 of the embodiment may be respectively coupled to corresponding sources to reduce the body effect. Furthermore, an electrostatic discharge protection circuit may be disposed on a path on which the output stage circuit 100 of the embodiment is coupled to the supply voltage VDD (e.g. coupled between the supply voltage VDD and the output terminal VOUT), and another electrostatic discharge protection circuit may also be disposed on a path on which the output stage circuit 100 of the embodiment is coupled to the ground terminal voltage VSS (e.g. coupled between the ground terminal voltage VSS and the output terminal VOUT). In another embodiments of the disclosure, the output stage circuit 100 may be designed or improved to have a function of an input stage circuit or to be applied to the input stage circuit.

Figure 2:
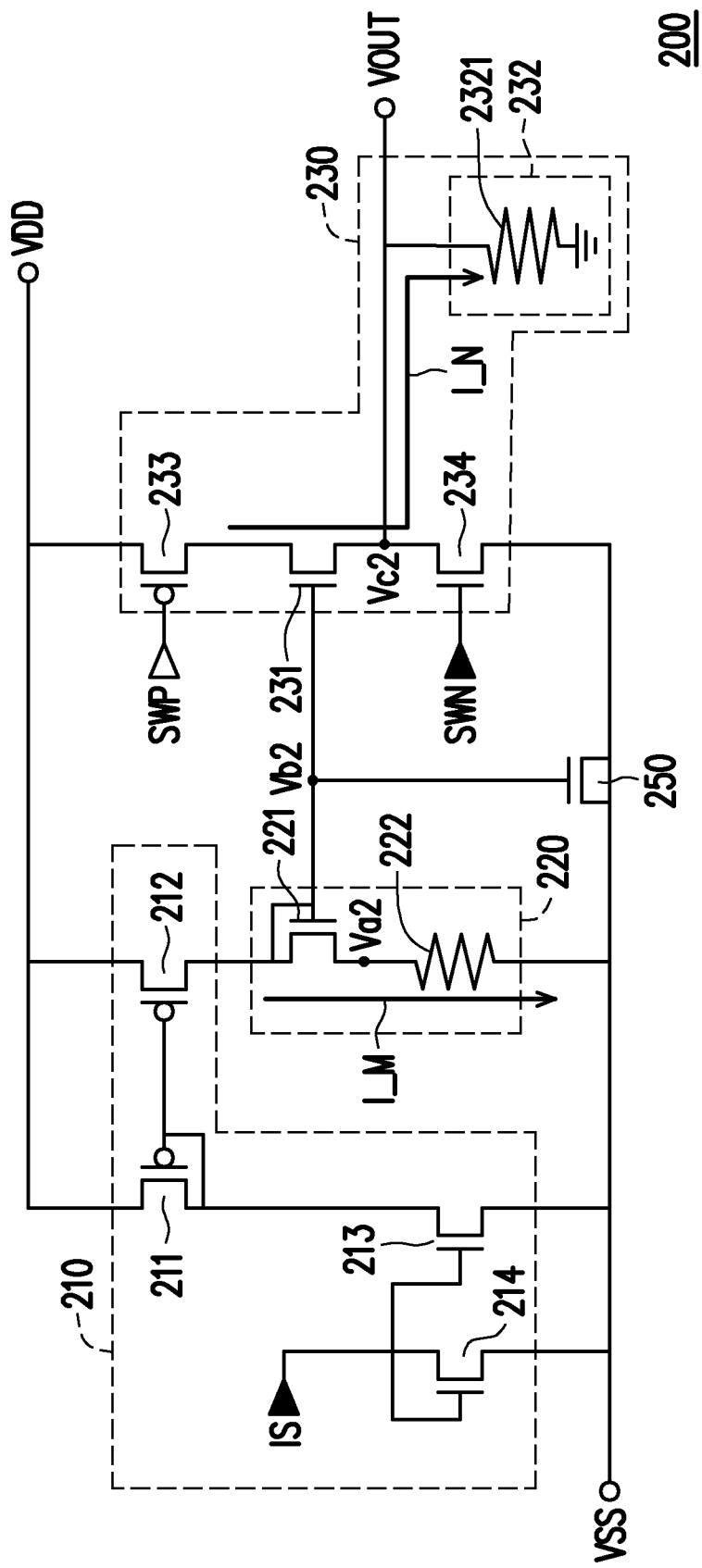
FIG. 2 is a schematic circuit diagram of an output stage circuit according to a first exemplary embodiment of the disclosure.

FIG. 2 is a schematic circuit diagram of an output stage circuit according to a first exemplary embodiment of the disclosure. Referring to FIG. 2, the embodiment may be a specific implementation example of the output stage circuit 100 shown in FIG. 1. In the embodiment, an output stage circuit 200 includes a current source circuit 210, a bias circuit 220, an output circuit 230, and a transistor capacitor 250. The bias circuit 220 and the output circuit 230 may form a replica bias circuit. The current source circuit 210 includes transistors 211 to 214. The bias circuit 220 includes a transistor 221 and a reference resistor 222. The output circuit 230 includes a transistor 231, a load circuit 232, a transistor 233, and a transistor 234.

In the embodiment, a first terminal of the transistor 211 is coupled to the supply voltage VDD. A second terminal of the transistor 211 is coupled to a control terminal of the transistor 211. A first terminal of the transistor 212 is coupled to the supply voltage VDD. A control terminal of the transistor 212 is coupled to the control terminal of the transistor 211. A second terminal of the transistor 212 is coupled to a first terminal of the transistor 221. A first terminal of the transistor 213 is coupled to the second terminal of the transistor 211. A second terminal of the transistor 213 is coupled to the ground terminal voltage VSS. A first terminal of the transistor 214 is coupled to a control terminal of the transistor 213, a control terminal of the transistor 214, and a current input terminal IS. A second terminal of the transistor 214 is coupled to the ground terminal voltage VSS. The first terminal of the transistor 221 is coupled to the second terminal of the transistor 212 and a control terminal of the transistor 221. A second terminal of the transistor 221 is coupled to the ground terminal voltage VSS through the reference resistor 222. A control terminal of the transistor 231 is coupled to the control terminal of the transistor 221. The load circuit 232 is coupled to a second terminal of the transistor 231 and the output terminal VOUT. A first terminal of the transistor 233 is coupled to the supply voltage VDD. A second terminal of the transistor 233 is coupled to a first terminal of the transistor 231. A first terminal of the transistor 234 is coupled to the second terminal of the transistor 231 and the output terminal VOUT. A second terminal of the transistor 234 is coupled to the ground terminal voltage VSS. A first terminal and a second terminal of the transistor capacitor 250 are short and are both coupled to the ground terminal voltage VSS. The second terminal of the transistor capacitor 250 is further coupled to the second terminal of the transistor 234. A control terminal of the transistor capacitor 250 is coupled to the control terminal of the transistor 221 and the control terminal of the transistor 231.

Note that the transistor 211 and the transistor 212 of the current source circuit 210 of the embodiment may be combined as a current mirror circuit. The current mirror circuit of the embodiment may effectively replicate an input current input by the current input terminal IS. In this way, the current I_M may be equal to or similar to the input current input by the current input terminal IS.

In the embodiment, the transistors 213, 214, 221, 231, and 234 and the transistor capacitor 250 may be N-type transistors, and the transistors 211, 212, and 233 may be P-type transistors. The load circuit 232 may include a resistor 2321, and the disclosure is not limited thereto. A control terminal of the transistor 233 and a control terminal of the transistor 234 may respectively receive the switch signal SWN and the switch signal SWP. In some embodiments of the disclosure, the switch signal SWN and the switch signal SWP may be the same switch signals; however, the disclosure is not limited thereto. In the embodiment, a turn-on period of the transistor 233 and a turn-on period of the transistor 234 are not overlapped; however, the disclosure is not limited thereto.

In the embodiment, the bias circuit 220 and the output circuit 230 may be respectively designed to cause a current ratio of the current I_M flowing through the bias circuit 220 to the current I_N flowing through the output circuit 230 to be M:N. M and N are positive integers. For example, the bias circuit 220 may include M transistors 221 connected in parallel, and the output circuit 230 may include N transistors 231 connected in parallel. M and N are positive integers. In addition, a ratio of a number of resistors connected in parallel of the reference resistor 222 of the bias circuit 220 to a number of resistors connected in parallel in the load circuit 232 of the output circuit 230 may be designed to be M:N. Therefore, in the embodiment, as shown in FIG. 2, after a voltage of a circuit node Va2 (the second terminal of the transistor 221) is set (i.e. the current I_M is set), a voltage of a circuit node Vb2 (the control terminal of the transistor 221) and a voltage of a circuit node Vc2 (the second terminal of the transistor 231) are fixed. In other words, when the current I_M changes, the voltage of the output terminal VOUT may follow the voltage of the circuit node Va2 to achieve the output stage function capable of adjusting the voltage level of the output voltage. Furthermore, the output stage circuit 200 of the embodiment may provide the stable output voltage signal according to the input current input by the current input terminal IS. Note that since the bias circuit 220 and the output circuit 230 have the same elements and the only difference is the numbers of the elements, the voltage level of the output voltage may accurately track the set voltage of the node Va2 without being affected by the process, the voltage, and/or the temperature.

In addition, bases of the transistors 211 to 214, 221, 231, 233, and 234 of the embodiment may be respectively coupled to corresponding sources to reduce the body effect. Furthermore, an electrostatic discharge protection circuit may be disposed on a path on which the output stage circuit 200 of the embodiment is coupled to the supply voltage VDD (e.g. coupled between the supply voltage VDD and the output terminal VOUT), and another electrostatic discharge protection circuit may also be disposed on a path on which the output stage circuit 200 of the embodiment is coupled to the ground terminal voltage VSS (e.g. coupled between the ground terminal voltage VSS and the output terminal VOUT).

Figure 3:
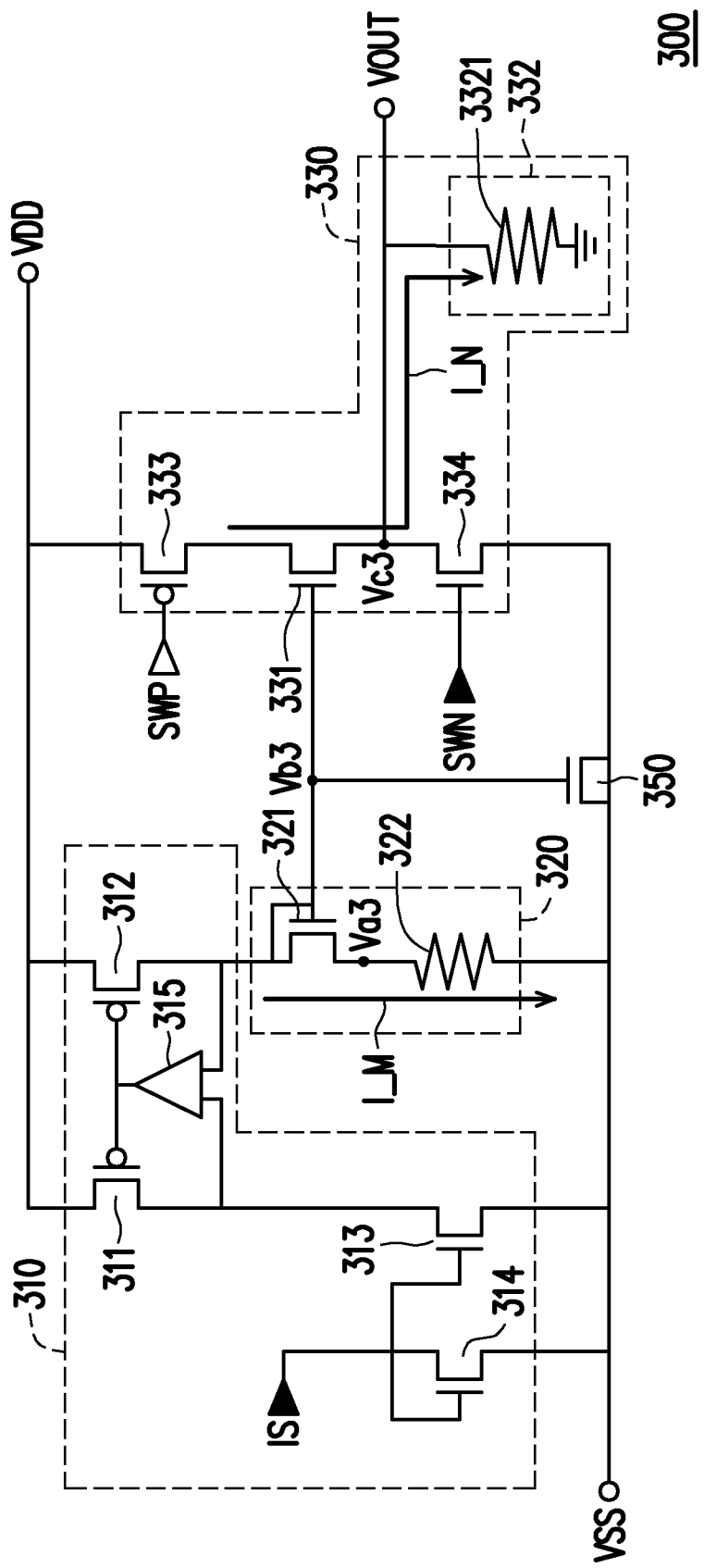
FIG. 3 is a schematic circuit diagram of an output stage circuit according to a second exemplary embodiment of the disclosure.

FIG. 3 is a schematic circuit diagram of an output stage circuit according to a second exemplary embodiment of the disclosure. Referring to FIG. 3, the embodiment may be a specific implementation example of the output stage circuit 100 shown in FIG. 1. In the embodiment, an output stage circuit 300 includes a current source circuit 310, a bias circuit 320, an output circuit 330, and a transistor capacitor 350. The bias circuit 320 and the output circuit 330 may form a replica bias circuit. The current source circuit 310 includes transistors 311 to 314 and an operational amplifier (OPA) 315. The bias circuit 320 includes a transistor 321 and a reference resistor 322. The output circuit 330 includes a transistor 331, a load circuit 332, a transistor 333, and a transistor 334.

In the embodiment, a first terminal of the transistor 311 is coupled to the supply voltage VDD. A first terminal of the transistor 312 is coupled to the supply voltage VDD. A control terminal of the transistor 312 is coupled to a control terminal of the transistor 311. A second terminal of the transistor 312 is coupled to a first terminal of the transistor 321. A first terminal of the transistor 313 is coupled to a second terminal of the transistor 311. A second terminal of the transistor 313 is coupled to the ground terminal voltage VSS. A first terminal of the transistor 314 is coupled to a control terminal of the transistor 313, a control terminal of the transistor 314, and the current input terminal IS. A second terminal of the transistor 314 is coupled to the ground terminal voltage VSS. A first input terminal of the operational amplifier 315 is coupled to the second terminal of the transistor 311. A second input terminal of the operational amplifier 315 is coupled to the second terminal of the transistor 312. An output terminal of the operational amplifier 315 is coupled to the control terminal of the transistor 311 and the control terminal of the transistor 312. The first terminal of the transistor 321 is coupled to the second terminal of the transistor 312 and a control terminal of the transistor 321. A second terminal of the transistor 321 is coupled to the ground terminal voltage VSS through the reference resistor 322. A control terminal of the transistor 331 is coupled to the control terminal of the transistor 321.

The load circuit 332 is coupled to a second terminal of the transistor 331 and the output terminal VOUT. A first terminal of the transistor 333 is coupled to the supply voltage VDD. A second terminal of the transistor 333 is coupled to a first terminal of the transistor 331. A first terminal of the transistor 334 is coupled to the second terminal of the transistor 331 and the output terminal VOUT. A second terminal of the transistor 334 is coupled to the ground terminal voltage VSS. A first terminal and a second terminal of the transistor capacitor 350 are short and are both coupled to the ground terminal voltage VSS. The second terminal of the transistor capacitor 350 is further coupled to the second terminal of the transistor 334. A control terminal of the transistor capacitor 350 is coupled to the control terminal of the transistor 321 and the control terminal of the transistor 331.

Note that the transistor 311, the transistor 312, and the operational amplifier 315 of the current source circuit 310 of the embodiment may be combined as an OPA type current mirror circuit. The two input terminals of the operational amplifier 315 are coupled between the two second output terminals of the transistor 311 and the transistor 312, the output terminal of the operational amplifier 315 is coupled between the two control terminals of the transistor 311 and the transistor 312. As a result, the operational amplifier 315 of the embodiment may effectively lock currents respectively flowing through the transistor 311 and the transistor 312 so that the current mirror circuit of the embodiment may effectively replicate the input current input by the current input terminal IS. In this way, the current I_M may be equal to or similar to the input current input by the current input terminal IS.

In the embodiment, the transistors 313, 314, 321, 331, and 334 and the transistor capacitor 350 may be N-type transistors, and the transistors 311, 312, and 333 may be P-type transistors. The load circuit 332 may include a resistor 3321, and the disclosure is not limited thereto. A control terminal of the transistor 333 and a control terminal of the transistor 334 may respectively receive the switch signal SWN and the switch signal SWP. In some embodiments of the disclosure, the switch signal SWN and the switch signal SWP may be the same switch signals; however, the disclosure is not limited thereto. In the embodiment, a turn-on period of the transistor 333 and a turn-on period of the transistor 334 are not overlapped; however, the disclosure is not limited thereto.

In the embodiment, the bias circuit 320 and the output circuit 330 may be respectively designed to cause a current ratio of a current I_M flowing through the bias circuit 320 to a current I_N flowing through the output circuit 330 to be M:N. M and N are positive integers. For example, the bias circuit 320 may include M transistors 321 connected in parallel, and the output circuit 330 may include N transistors 331 connected in parallel. M and N are positive integers. Or, a ratio of a number of resistors connected in parallel of the reference resistor 322 of the bias circuit 320 to a number of resistors connected in parallel in the load circuit 332 of the output circuit 330 may be designed to be M:N. Therefore, in the embodiment, as shown in FIG. 3, after a voltage of a circuit node Va3 (the second terminal of the transistor 321) is set (i.e. the current I_M is set), a voltage of a circuit node Vb3 (the control terminal of the transistor 321) and a voltage of a circuit node Vc3 (the second terminal of the transistor 331) are fixed. In other words, when the current I_M changes, the voltage of the output terminal VOUT may follow the voltage of the circuit node Va3 to achieve the output stage function capable of adjusting the voltage level of the output voltage. Furthermore, the output stage circuit 300 of the embodiment may provide the stable output voltage signal according to the input current input by the current input terminal IS. Note that since the bias circuit 320 and the output circuit 330 have the same elements and the only difference is the numbers of the elements, the voltage level of the output voltage may accurately track the set voltage of the node Va3 without being affected by the process, the voltage, and/or the temperature.

In addition, bases of the transistors 311 to 314, 321, 331, 333, and 334 of the embodiment may be respectively coupled to corresponding sources to reduce the body effect. Furthermore, an electrostatic discharge protection circuit may be disposed on a path on which the output stage circuit 300 of the embodiment is coupled to the supply voltage VDD (e.g. coupled between the supply voltage VDD and the output terminal VOUT), and another electrostatic discharge protection circuit may also be disposed on a path on which the output stage circuit 300 of the embodiment is coupled to the ground terminal voltage VSS (e.g. coupled between the ground terminal voltage VSS and the output terminal VOUT).

Figure 4:
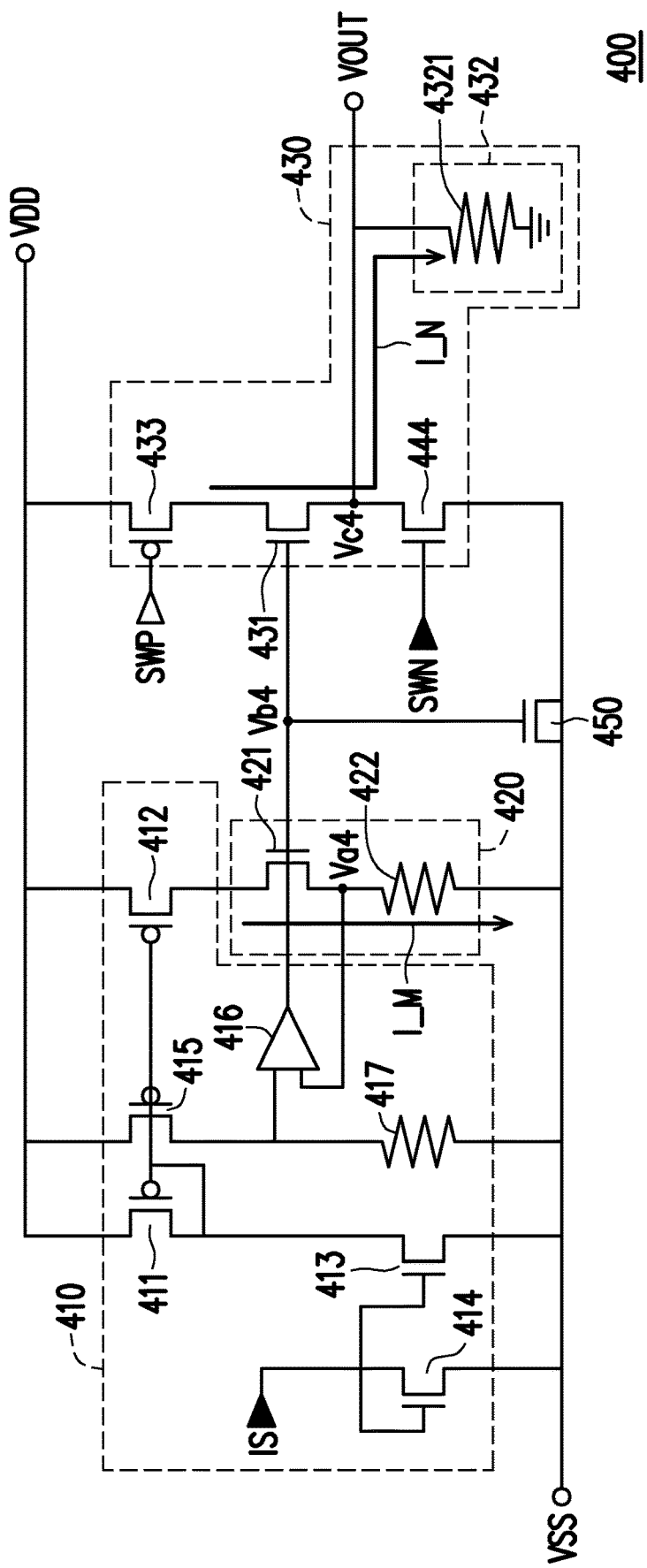
FIG. 4 is a schematic circuit diagram of an output stage circuit according to a third exemplary embodiment of the disclosure.

FIG. 4 is a schematic circuit diagram of an output stage circuit according to a third exemplary embodiment of the disclosure. Referring to FIG. 4, the embodiment may be a specific implementation example of the output stage circuit 100 shown in FIG. 1. In the embodiment, an output stage circuit 400 includes a current source circuit 410, a bias circuit 420, an output circuit 430, and a transistor capacitor 450. The bias circuit 420 and the output circuit 430 may form a replica bias circuit. The current source circuit 410 includes transistors 411 to 415, an operational amplifier 416, and a reference resistor 417. The bias circuit 420 includes a transistor 421 and a reference resistor 422. The output circuit 430 includes a transistor 431, a load circuit 432, a transistor 433, and a transistor 434.

In the embodiment, a first terminal of the transistor 411 is coupled to the supply voltage VDD. A second terminal of the transistor 411 is coupled to a control terminal of the transistor 411. A first terminal of the transistor 412 is coupled to the supply voltage VDD. A control terminal of the transistor 412 is coupled to the control terminal of the transistor 411. A second terminal of the transistor 412 is coupled to a first terminal of the transistor 421. A first terminal of the transistor 413 is coupled to a second terminal of the transistor 411. A second terminal of the transistor 413 is coupled to the ground terminal voltage VSS. A first terminal of the transistor 414 is coupled to a control terminal of the transistor 413, a control terminal of the transistor 414, and the current input terminal IS. A second terminal of the transistor 414 is coupled to the ground terminal voltage VSS. The control terminal of the transistor 411 is coupled to the second terminal of the transistor 411. A first terminal of the transistor 415 is coupled to the supply voltage VDD. A control terminal of the transistor 415 is coupled to the control terminal of the transistor 411 and the control terminal of the transistor 412. A second terminal of the transistor 415 is coupled to the ground terminal voltage VSS through the reference resistor 417. A first input terminal of the operational amplifier 416 is coupled to the second terminal of the transistor 415. A second input terminal of the operational amplifier 416 is coupled to a second terminal of the transistor 421. An output terminal of the operational amplifier 416 is coupled to a control terminal of the transistor 421.

In the embodiment, the first terminal of the transistor 421 is coupled to the second terminal of the transistor 412. The second terminal of the transistor 421 is coupled to the ground terminal voltage VSS through the reference resistor 422. A control terminal of the transistor 431 is coupled to the control terminal of the transistor 421. The load circuit 432 is coupled to a second terminal of the transistor 431 and the output terminal VOUT. A first terminal of the transistor 433 is coupled to the supply voltage VDD. A second terminal of the transistor 433 is coupled to a first terminal of the transistor 431. A first terminal of the transistor 434 is coupled to the second terminal of the transistor 431 and the output terminal VOUT. A second terminal of the transistor 434 is coupled to the ground terminal voltage VSS. A first terminal and a second terminal of the transistor capacitor 450 are short and are both coupled to the ground terminal voltage VSS. The second terminal of the transistor capacitor 450 is further coupled to the second terminal of the transistor 434. A control terminal of the transistor capacitor 450 is coupled to the control terminal of the transistor 421 and the control terminal of the transistor 431.

Note that the transistor 411, the transistor 412, and the transistor 415 of the current source circuit 410 of the embodiment may be combined as a current mirror circuit, and the control terminal of the transistor 421 of the embodiment is not coupled to the first terminal of the transistor 421. An output terminal of the operational amplifier 416 of the embodiment is coupled to the control terminal of the transistor 421 to fix a voltage of the control terminal of the transistor 421. Therefore, the operational amplifier 416 of the embodiment may effectively lock the current I_M flowing through the transistor 421. More importantly, there may be more voltage headroom between the first terminal of the transistor 421 and the supply voltage VDD. In this way, the current I_M may be equal to or similar to the input current input by the current input terminal IS.

In the embodiment, the transistors 413, 414, 421, 431, and 434 and the transistor capacitor 450 may be N-type transistors, and the transistors 411, 412, 415, and 433 may be P-type transistors. The load circuit 432 may include a resistor 4321, and the disclosure is not limited thereto. A control terminal of the transistor 433 and a control terminal of the transistor 434 may respectively receive the switch signal SWN and the switch signal SWP. In some embodiments of the disclosure, the switch signal SWN and the switch signal SWP may be the same switch signals; however, the disclosure is not limited thereto. In the embodiment, a turn-on period of the transistor 433 and a turn-on period of the transistor 434 are not overlapped; however, the disclosure is not limited thereto.

In the embodiment, the bias circuit 420 and the output circuit 430 may be respectively designed to cause a current ratio of the current I_M flowing through the bias circuit 420 to the current I_N flowing through the output circuit 430 to be M:N. M and N are positive integers. For example, the bias circuit 420 may include M transistors 421 connected in parallel, and the output circuit 430 may include N transistors 431 connected in parallel. M and N are positive integers. Or, a ratio of a number of resistors connected in parallel of the reference resistor 422 of the bias circuit 420 to a number of resistors connected in parallel in the load circuit 432 of the output circuit 430 may be designed to be M:N. Therefore, in the embodiment, as shown in FIG. 4, after a voltage of a circuit node Va4 (the second terminal of the transistor 421) is set (i.e. the current I_M is set), a voltage of a circuit node Vb4 (the control terminal of the transistor 421) and a voltage of a circuit node Vc4 (the second terminal of the transistor 431) are fixed. In other words, when the current I_M changes, the voltage of the output terminal VOUT may follow the voltage of the circuit node Va4 to achieve the output stage function capable of adjusting the voltage level of the output voltage. Furthermore, the output stage circuit 400 of the embodiment may provide the stable output voltage signal according to the input current input by the current input terminal IS. Note that since the bias circuit 420 and the output circuit 430 have the same elements and the only difference is the numbers of the elements, the voltage level of the output voltage may accurately track the set voltage of the node Va4 without being affected by the process, the voltage, and/or the temperature.

In addition, bases of the transistors 411 to 415, 421, 431, 433, and 434 of the embodiment may be respectively coupled to corresponding sources to reduce the body effect. Furthermore, an electrostatic discharge protection circuit may be disposed on a path on which the output stage circuit 400 of the embodiment is coupled to the supply voltage VDD (e.g. coupled between the supply voltage VDD and the output terminal VOUT), and another electrostatic discharge protection circuit may also be disposed on a path on which the output stage circuit 400 of the embodiment is coupled to the ground terminal voltage VSS (e.g. coupled between the ground terminal voltage VSS and the output terminal VOUT).

Figure 5:
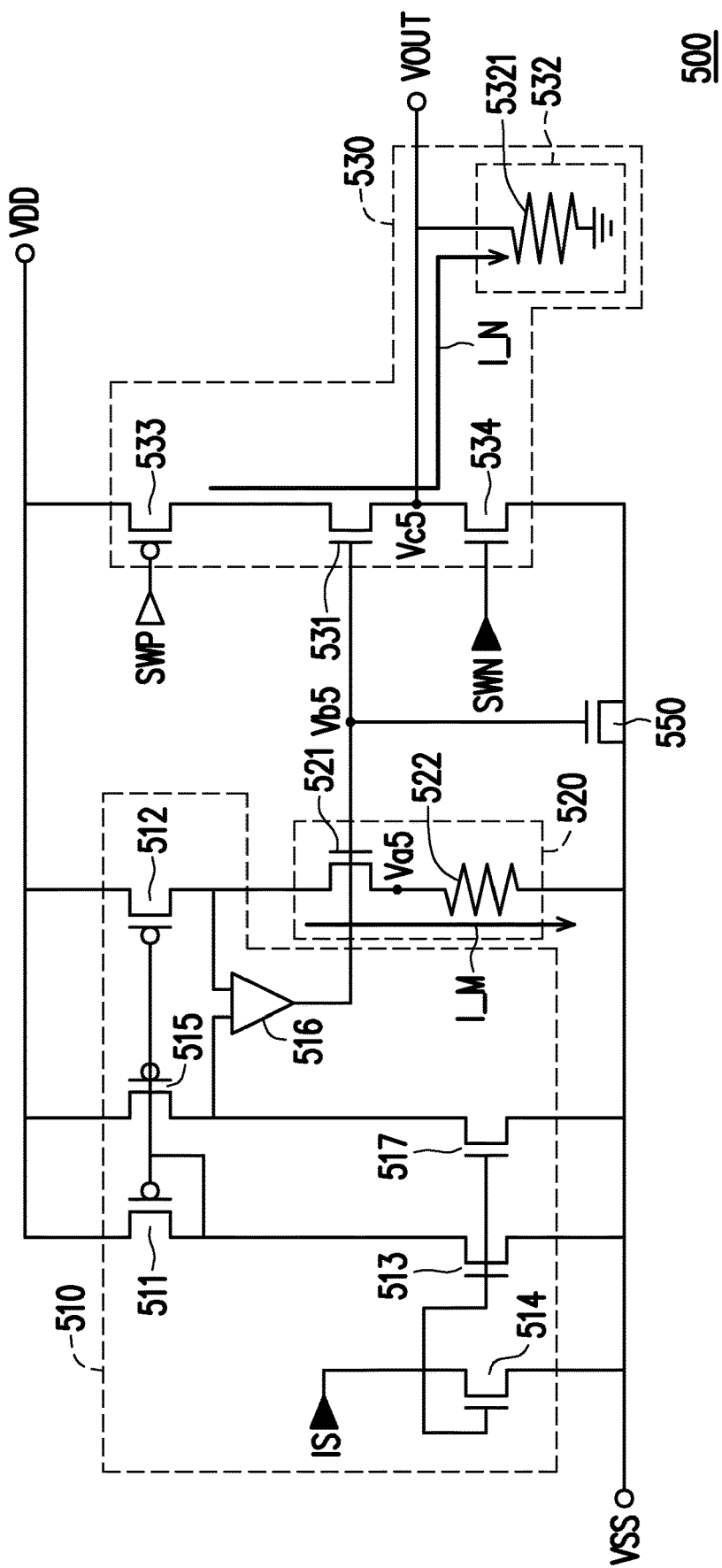
FIG. 5 is a schematic circuit diagram of an output stage circuit according to a fourth exemplary embodiment of the disclosure.

FIG. 5 is a schematic circuit diagram of an output stage circuit according to a fourth exemplary embodiment of the disclosure. Referring to FIG. 5, the embodiment may be a specific implementation example of the output stage circuit 100 shown in FIG. 1. In the embodiment, an output stage circuit 500 includes a current source circuit 510, a bias circuit 520, an output circuit 530, and a transistor capacitor 550. The bias circuit 520 and the output circuit 530 may form a replica bias circuit. The current source circuit 510 includes transistors 511 to 515, and 517 and an operational amplifier 516. The bias circuit 520 includes a transistor 521 and a reference resistor 522. The output circuit 530 includes a transistor 531, a load circuit 532, a transistor 533, and a transistor 534.

In the embodiment, a first terminal of the transistor 511 is coupled to the supply voltage VDD. A second terminal of the transistor 511 is coupled to a control terminal of the transistor 511. A first terminal of the transistor 512 is coupled to the supply voltage VDD. A control terminal of the transistor 512 is coupled to the control terminal of the transistor 511. A second terminal of the transistor 512 is coupled to a first terminal of the transistor 521. A first terminal of the transistor 513 is coupled to the second terminal of the transistor 511. A second terminal of the transistor 513 is coupled to the ground terminal voltage VSS. A first terminal of the transistor 514 is coupled to a control terminal of the transistor 513, a control terminal of the transistor 514, and the current input terminal IS. A second terminal of the transistor 514 is coupled to the ground terminal voltage VSS. The control terminal of the transistor 511 is coupled to the second terminal of the transistor 511. A first terminal of the transistor 515 is coupled to the supply voltage VDD. A control terminal of the transistor 515 is coupled to the control terminal of the transistor 511 and the control terminal of the transistor 512. A second terminal of the transistor 515 is coupled to a first terminal of the transistor 517. A second terminal of the transistor 517 is coupled to the ground terminal voltage VSS. A control terminal of the transistor 517 is coupled to the control terminal of the transistor 513. A first input terminal of the operational amplifier 516 is coupled to the second terminal of the transistor 512. A second input terminal of the operational amplifier 516 is coupled to the second terminal of the transistor 515. An output terminal of the operational amplifier 516 is coupled to a control terminal of the transistor 521.

In the embodiment, the first terminal of the transistor 521 is coupled to the second terminal of the transistor 512. The second terminal of the transistor 521 is coupled to the ground terminal voltage VSS through the reference resistor 522. A control terminal of the transistor 531 is coupled to the control terminal of the transistor 521. The load circuit 532 is coupled to a second terminal of the transistor 531 and the output terminal VOUT. A first terminal of the transistor 533 is coupled to the supply voltage VDD. A second terminal of the transistor 533 is coupled to a first terminal of the transistor 531. A first terminal of the transistor 534 is coupled to the second terminal of the transistor 531 and the output terminal VOUT. A second terminal of the transistor 534 is coupled to the ground terminal voltage VSS. A first terminal and a second terminal of the transistor capacitor 550 are short and are both coupled to the ground terminal voltage VSS. The second terminal of the transistor capacitor 550 is further coupled to the second terminal of the transistor 534. A control terminal of the transistor capacitor 550 is coupled to the control terminal of the transistor 521 and the control terminal of the transistor 531.

Note that the transistor 511, the transistor 512, the transistor 515, and the operational amplifier 516 of the current source circuit 510 of the embodiment may be combined as an OPA type current mirror circuit, and the control terminal of the transistor 521 of the embodiment is not coupled to the first terminal of the transistor 521. The two input terminals of the operational amplifier 516 of the embodiment are coupled between the two second terminals of the transistor 512 and the transistor 515 to lock currents flowing through the transistor 512 and the transistor 515. Furthermore, an output terminal of the operational amplifier 516 of the embodiment is coupled to the control terminal of the transistor 521 to fix a voltage of the control terminal of the transistor 521. Therefore, the operational amplifier 516 of the embodiment may effectively lock the current I_M flowing through the transistor 521. More importantly, there may be more voltage headroom between the first terminal of the transistor 521 and the supply voltage VDD. In this way, the current I_M may be equal to or similar to the input current input by the current input terminal IS.

In the embodiment, the transistors 513, 514, 517, 521, 531, and 533 and the transistor capacitor 550 may be N-type transistors, and the transistors 511, 512, 515, and 534 may be P-type transistors. The load circuit 532 may include a resistor 5321, and the disclosure is not limited thereto. A control terminal of the transistor 533 and a control terminal of the transistor 534 may respectively receive the switch signal SWN and the switch signal SWP. In some embodiments of the disclosure, the switch signal SWN and the switch signal SWP may be the same switch signals; however, the disclosure is not limited thereto. In the embodiment, a turn-on period of the transistor 533 and a turn-on period of the transistor 534 are not overlapped; however, the disclosure is not limited thereto.

In the embodiment, the bias circuit 520 and the output circuit 530 may be respectively designed to cause a current ratio of the current I_M flowing through the bias circuit 520 to the current I_N flowing through the output circuit 530 to be M:N. M and N are positive integers. For example, the bias circuit 520 may include M transistors 521 connected in parallel, and the output circuit 530 may include N transistors 531 connected in parallel. M and N are positive integers. Or, a ratio of a number of resistors connected in parallel of the reference resistor 522 of the bias circuit 520 to a number of resistors connected in parallel in the load circuit 532 of the output circuit 530 may be designed to be M:N. Therefore, in the embodiment, as shown in FIG. 5, after a voltage of a circuit node Va5 (the second terminal of the transistor 521) is set (i.e. the current I_M is set), a voltage of a circuit node Vb5 (the control terminal of the transistor 521) and a voltage of a circuit node Vc5 (the second terminal of the transistor 531) are fixed. In other words, when the current I_M changes, the voltage of the output terminal VOUT may follow the voltage of the circuit node Va5 to achieve the output stage function capable of adjusting the voltage level of the output voltage. Furthermore, the output stage circuit 500 of the embodiment may provide the stable output voltage signal according to the input current input by the current input terminal IS. Note that since the bias circuit 520 and the output circuit 530 have the same elements and the only difference is the numbers of the elements, the voltage level of the output voltage may accurately track the set voltage of the node Va5 without being affected by the process, the voltage, and/or the temperature.

In addition, bases of the transistors 511 to 515, 517, 521, 531, 533, 534, and 550 of the embodiment may be respectively coupled to corresponding sources to reduce the body effect. Furthermore, an electrostatic discharge protection circuit may be disposed on a path on which the output stage circuit 500 of the embodiment is coupled to the supply voltage VDD (e.g. coupled between the supply voltage VDD and the output terminal VOUT), and another electrostatic discharge protection circuit may also be disposed on a path on which the output stage circuit 500 of the embodiment is coupled to the ground terminal voltage VSS (e.g. coupled between the ground terminal voltage VSS and the output terminal VOUT).

Figure 6:
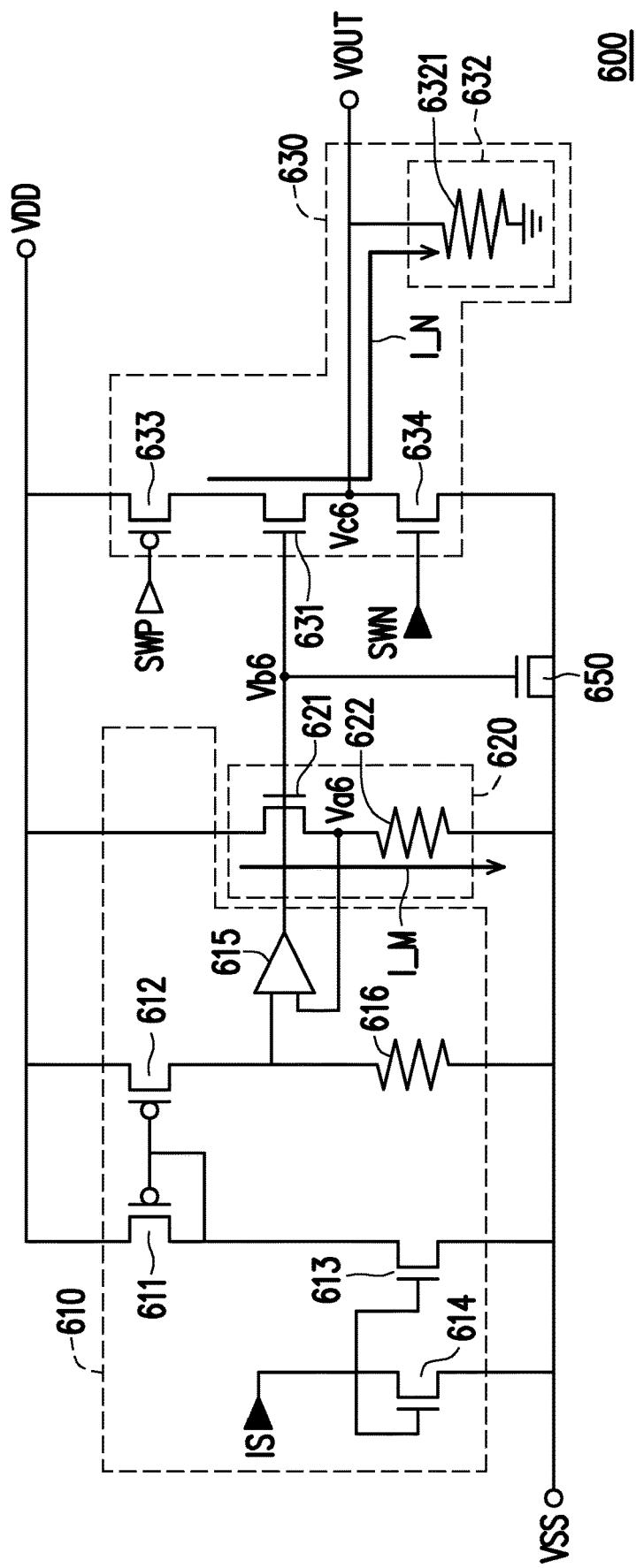
FIG. 6 is a schematic circuit diagram of an output stage circuit according to a fifth exemplary embodiment of the disclosure.

FIG. 6 is a schematic circuit diagram of an output stage circuit according to a fifth exemplary embodiment of the disclosure. Referring to FIG. 6, the embodiment may be a specific implementation example of the output stage circuit 100 shown in FIG. 1. In the embodiment, an output stage circuit 600 includes a current source circuit 610, a bias circuit 620, an output circuit 630, and a transistor capacitor 650. The bias circuit 620 and the output circuit 630 may form a replica bias circuit. The current source circuit 610 includes transistors 611 to 614, an operational amplifier 615, and a reference resistor 616. The bias circuit 620 includes a transistor 621 and a reference resistor 622. The output circuit 630 includes a transistor 631, a load circuit 632, a transistor 633, and a transistor 634.

In the embodiment, a first terminal of the transistor 611 is coupled to the supply voltage VDD. A second terminal of the transistor 611 is coupled to a control terminal of the transistor 611. A first terminal of the transistor 612 is coupled to the supply voltage VDD. A control terminal of the transistor 612 is coupled to the control terminal of the transistor 611. A second terminal of the transistor 612 is coupled to the ground terminal voltage VSS through the reference resistor 616. A first terminal of the transistor 613 is coupled to the second terminal of the transistor 611. A second terminal of the transistor 613 is coupled to the ground terminal voltage VSS. A first terminal of the transistor 614 is coupled to a control terminal of the transistor 613, a control terminal of the transistor 614, and the current input terminal IS. A second terminal of the transistor 614 is coupled to the ground terminal voltage VSS. The control terminal of the transistor 611 is coupled to the second terminal of the transistor 611. A first input terminal of the operational amplifier 616 is coupled to the second terminal of the transistor 612. A second input terminal of the operational amplifier 616 is coupled to a second terminal of the transistor 621. An output terminal of the operational amplifier 616 is coupled to a control terminal of the transistor 621.

In the embodiment, the first terminal of the transistor 621 is coupled to the second terminal of the transistor 612. The second terminal of the transistor 621 is coupled to the ground terminal voltage VSS through the reference resistor 622. A control terminal of the transistor 631 is coupled to the control terminal of the transistor 621. The load circuit 632 is coupled to a second terminal of the transistor 631 and the output terminal VOUT. A first terminal of the transistor 633 is coupled to the supply voltage VDD. A second terminal of the transistor 633 is coupled to a first terminal of the transistor 631. A first terminal of the transistor 634 is coupled to the second terminal of the transistor 631 and the output terminal VOUT. A second terminal of the transistor 634 is coupled to the ground terminal voltage VSS. A first terminal and a second terminal of the transistor capacitor 650 are short and are both coupled to the ground terminal voltage VSS. The second terminal of the transistor capacitor 650 is further coupled to the second terminal of the transistor 634. A control terminal of the transistor capacitor 650 is coupled to the control terminal of the transistor 621 and the control terminal of the transistor 631.

Note that the transistor 611, the transistor 612, and the operational amplifier 616 of the current source circuit 610 of the embodiment may be combined as an OPA type current mirror circuit, and the control terminal of the transistor 621 of the embodiment is not coupled to the first terminal of the transistor 621. The two input terminals of the operational amplifier 616 of the embodiment are coupled between the two second terminals of the transistor 612 and the transistor 621 to lock currents flowing through the transistor 612 and the transistor 621. Furthermore, the output terminal of the operational amplifier 616 of the embodiment is coupled to the control terminal of the transistor 621 to fix a voltage of the control terminal of the transistor 621. Therefore, the operational amplifier 616 of the embodiment may effectively lock the current I_M flowing through the transistor 621. More importantly, there may be more voltage headroom between the first terminal of the transistor 621 and the supply voltage VDD. In this way, the current I_M may be equal to or similar to the input current input by the current input terminal IS.

In the embodiment, the transistors 613, 614, 621, 631, and 633 and the transistor capacitor 650 may be N-type transistors, and the transistors 611, 612, and 634 may be P-type transistors. The load circuit 632 may include a resistor 6321, and the disclosure is not limited thereto. A control terminal of the transistor 633 and a control terminal of the transistor 634 may respectively receive the switch signal SWN and the switch signal SWP. In some embodiments of the disclosure, the switch signal SWN and the switch signal SWP may be the same switch signals; however, the disclosure is not limited thereto. In the embodiment, a turn-on period of the transistor 633 and a turn-on period of the transistor 634 are not overlapped; however, the disclosure is not limited thereto.

In the embodiment, the bias circuit 620 and the output circuit 630 may be respectively designed to cause a current ratio of the current I_M flowing through the bias circuit 620 to the current I_N flowing through the output circuit 630 to be M:N. M and N are positive integers. For example, the bias circuit 620 may include M transistors 621 connected in parallel, and the output circuit 630 may include N transistors 631 connected in parallel. M and N are positive integers. Or, a ratio of a number of resistors connected in parallel of the reference resistor 622 of the bias circuit 620 to a number of resistors connected in parallel in the load circuit 632 of the output circuit 630 may be designed to be M:N. Therefore, in the embodiment, as shown in FIG. 6, after a voltage of a circuit node Va6 (the second terminal of the transistor 621) is set (i.e. the current I_M is set), a voltage of a circuit node Vb6 (the control terminal of the transistor 621) and a voltage of a circuit node Vc6 (the second terminal of the transistor 631) are fixed. In other words, when the current I_M changes, the voltage of the output terminal VOUT may follow the voltage of the circuit node Va6 to achieve the output stage function capable of adjusting the voltage level of the output voltage. Furthermore, the output stage circuit 600 of the embodiment may provide the stable output voltage signal according to the input current input by the current input terminal IS. Note that since the bias circuit 620 and the output circuit 630 have the same elements and the only difference is the numbers of the elements, the voltage level of the output voltage may accurately track the set voltage of the node Va6 without being affected by the process, the voltage, and/or the temperature.

In addition, bases of the transistors 611 to 614, 621, 631, 633, 634, and 650 of the embodiment may be respectively coupled to corresponding sources to reduce the body effect. Furthermore, an electrostatic discharge protection circuit may be disposed on a path on which the output stage circuit 600 of the embodiment is coupled to the supply voltage VDD (e.g. coupled between the supply voltage VDD and the output terminal VOUT), and another electrostatic discharge protection circuit may also be disposed on a path on which the output stage circuit 600 of the embodiment is coupled to the ground terminal voltage VSS (e.g. coupled between the ground terminal voltage VSS and the output terminal VOUT).

In summary of the above, the output stage circuit of the disclosure may provide the corresponding and stable output voltage signal according to the input current, and the framework of the output stage circuit of the disclosure is with a regulator-free design. In the output stage circuit framework of the disclosure, with a circuit design of the bias circuit and the output circuit, a flexible current conversion ratio is provided so that the voltage level of the output voltage can be flexibly adjusted. Note that with a framework of the replica bias circuit, the voltage level of the output voltage may accurately track the set voltage without being affected by the process, the voltage, and/or the temperature. In addition, in the output stage circuit of the disclosure, the electrostatic discharge protection circuit is additionally disposed to provide the favorable function of the output stage circuit.

Although the disclosure has been described with reference to the above embodiments, they are not intended to limit the disclosure. It will be apparent to one of ordinary skill in the art that modifications to the described embodiments may be made without departing from the spirit and the scope of the disclosure. Accordingly, the scope of the disclosure will be defined by the attached claims and their equivalents and not by the above detailed descriptions.

What is claimed is:

1. An output stage circuit, comprising:
a current source circuit;
a bias circuit coupled between the current source circuit and a ground terminal voltage; and
an output circuit, comprising:
a first transistor, wherein a control terminal of the first transistor is coupled to the bias circuit; and
a load circuit coupled to a second terminal of the first transistor and an output terminal;
a second transistor, wherein a first terminal of the second transistor is coupled to a supply voltage, and a second terminal of the second transistor is coupled to a first terminal of the first transistor; and
a third transistor, wherein a first terminal of the third transistor is coupled to the second terminal of the first transistor and the output terminal, and a second terminal of the third transistor is coupled to the ground terminal voltage,
wherein the bias circuit comprises:
a fourth transistor, wherein a first terminal of the fourth transistor is coupled to the current source circuit, a second terminal of the fourth transistor is coupled to the ground terminal voltage, and a control terminal of the fourth transistor is coupled to the control terminal of the first transistor and the first terminal of the fourth transistor, and
a reference resistor, wherein a first terminal of the reference resistor is coupled to the second terminal of the fourth transistor and the control terminal of the first transistor, and a second terminal of the reference resistor is coupled to the ground terminal voltage,
wherein the current source circuit comprises:
a fifth transistor, wherein a first terminal of the fifth transistor is coupled to the supply voltage;
a sixth transistor, wherein a first terminal of the sixth transistor is coupled to the supply voltage, a control terminal of the sixth transistor is coupled to a control terminal of the fifth transistor, and a second terminal of the sixth transistor is coupled to the bias circuit;
a seventh transistor, wherein a first terminal of the seventh transistor is coupled to a second terminal of the fifth transistor and the control terminal of the fifth transistor, and a second terminal of the seventh transistor is coupled to the ground terminal voltage; and
an eighth transistor, wherein a first terminal of the eighth transistor is coupled to a control terminal of the seventh transistor, a control terminal of the eighth transistor, and a current input terminal, and a second terminal of the eighth transistor is coupled to the ground terminal voltage.

2. The output stage circuit according to claim 1, wherein the second transistor is a P-type transistor, and the first transistor and the third transistor are N-type transistors.

3. The output stage circuit according to claim 1, wherein the load circuit comprises a resistor and/or a capacitor.

4. The output stage circuit according to claim 1, wherein the fifth transistor and the sixth transistor are P-type transistors, and the seventh transistor and the eighth transistor are N-type transistors.

5. The output stage circuit according to claim 1, wherein the current source circuit further comprises:
a first operational amplifier, wherein a first input terminal of the first operational amplifier is coupled to the second terminal of the fifth transistor, a second input terminal of the first operational amplifier is coupled to the second terminal of the sixth transistor, and an output terminal of the first operational amplifier is coupled to the control terminal of the fifth transistor and the control terminal of the sixth transistor.

6. The output stage circuit according to claim 1, wherein the control terminal of the fifth transistor is coupled to the second terminal of the fifth transistor, and the output stage circuit further comprises:

a ninth transistor, wherein a first terminal of the ninth transistor is coupled to the supply voltage, a control terminal of the ninth transistor is coupled to the control terminal of the fifth transistor and the control terminal of the sixth transistor, and a second terminal of the ninth transistor is coupled to a reference resistor; and a second operational amplifier, wherein a first input terminal of the second operational amplifier is coupled to the second terminal of the ninth transistor, a second input terminal of the second operational amplifier is coupled to the second terminal of the fourth transistor, and an output terminal of the second operational amplifier is coupled to the control terminal of the fourth transistor and the control terminal of the first transistor.

7. The output stage circuit according to claim 6, wherein the ninth transistor is a P-type transistor.

8. The output stage circuit according to claim 1, wherein the control terminal of the fifth transistor is coupled to the second terminal of the fifth transistor, and the output stage circuit further comprises:
   a tenth transistor, wherein a first terminal of the tenth transistor is coupled to the supply voltage, a control terminal of the tenth transistor is coupled to the control terminal of the fifth transistor and the control terminal of the sixth transistor;
   an eleventh transistor, wherein a first terminal of the eleventh transistor is coupled to a second terminal of the tenth transistor, a control terminal of the eleventh transistor is coupled to the control terminal of the seventh transistor, and a second terminal of the eleventh transistor is coupled to the ground terminal voltage; and
   a third operational amplifier, wherein a first input terminal of the third operational amplifier is coupled to the second terminal of the tenth transistor, a second input terminal of the third operational amplifier is coupled to the second terminal of the sixth transistor, and an output terminal of the third operational amplifier is coupled to the control terminal of the fourth transistor and the control terminal of the first transistor.

9. The output stage circuit according to claim 8, wherein the tenth transistor is a P-type transistor, and the eleventh transistor is an N-type transistor.

10. The output stage circuit according to claim 1, wherein the current source circuit comprises:
    a twelfth transistor, wherein a first terminal of the twelfth transistor is coupled to the supply voltage, and a control terminal of the twelfth transistor is coupled to a second terminal of the twelfth transistor;
    a thirteenth transistor, wherein a first terminal of the thirteenth transistor is coupled to the supply voltage, a control terminal of the thirteenth transistor is coupled to the control terminal of the twelfth transistor, and the second terminal of the thirteenth transistor is coupled to a reference resistor;
    a fourth operational amplifier, wherein a first input terminal of the fourth operational amplifier is coupled to the second terminal of the thirteenth transistor, a second input terminal of the fourth operational amplifier is coupled to the second terminal of the fourth transistor, and an output terminal of the fourth operational amplifier is coupled to the control terminal of the fourth transistor;
    a fourteenth transistor, wherein a first terminal of the fourteenth transistor is coupled to the second terminal of the twelfth transistor, and a second terminal of the fourteenth transistor is coupled to the ground terminal voltage; and
    a fifteenth transistor, wherein a first terminal of the fifteenth transistor is coupled to a control terminal of the fourteenth transistor, a control terminal of the fifteenth transistor, and a current input terminal, and a second terminal of the fifteenth transistor is coupled to the ground terminal voltage.

11. The output stage circuit according to claim 10, wherein the twelfth transistor and the thirteenth transistor are P-type transistors, and the fourteenth transistor and the fifteenth transistor are N-type transistors.

12. The output stage circuit according to claim 1, wherein a control terminal of the second transistor receives a first switch signal, and a control terminal of the third transistor receives a second switch signal.

13. The output stage circuit according to claim 1, wherein a turn-on period of the second transistor and a turn-on period of the third transistor are not overlapped.

14. The output stage circuit according to claim 1, further comprising:
    a transistor capacitor, wherein a first terminal of the transistor capacitor and a second terminal of the transistor capacitor are short and are coupled to the ground terminal voltage, the second terminal of the transistor capacitor is further coupled to the second terminal of the third transistor, and a control terminal of the transistor capacitor is coupled to the control terminal of the first transistor and the bias circuit.

15. The output stage circuit according to claim 1, wherein a current ratio of a first current flowing through the bias circuit to a second current flowing through the output circuit is M:N, wherein M and N are positive integers.

16. The output stage circuit according to claim 1, wherein the bias circuit comprises the M fourth transistors connected in parallel, and the output circuit comprises the N first transistors connected in parallel, wherein M and N are positive integers.

* * * * *